Patented Apr. 16, 1940

2,197,500

UNITED STATES PATENT OFFICE 2,197,500

INSECTICIDAL COMPOSITION AND METHOD OF PREPARING THE SAME

George L. Hockenyos, Springfield, Ill., assignor to Monsanto Chemical Company, St. Louis, Mo., a corporation of Delaware No Drawing. Application May 7, 1934, Serial No. 724,454

16 Claims. (Cl. 167—24)

This invention relates to improvements in insecticidal compositions and it has particular application to compositions of the rotenone and pyrethrum type which are to be used as sprays.

One object of the invention is to provide an insecticide, the active principle of which is of the rotenone and pyrethrum class and which may be prepared either in a dry, pulverant form or in a concentrated solution, either of which is readily soluble or dispersible in water. Another object of the invention is to provide an insecticide composition that is readily soluble or dispersible in hard water that may contain salts which tend to precipitate ordinary soaps.

A further object of the present invention is to provide a rotenone and pyrethrum insecticide which is readily soluble or dispersible in water, the solubilizing and dispersing agent of which is itself not only a potent wetting agent but in addition is an active insecticide or contact poison. The foregoing and other objects of my invention will be readily apparent from the following description of the principles of my invention and specific embodiments thereof.

Pyrethrum sprays have been used extensively heretofore. One of the most common of these consists of a kerosene solution of the active principle, the use of which is largely limited to household purposes for exterminating flies, mosquitoes and the like. It has also been proposed to disperse rotenone or pyrethrum, or preferably the resinous extracts containing one of these active principles, in soap solution or tannic acid, either alone or in admixture with fatty acids such as oleic acid. For this purpose it is common practice to dissolve the active principle or the resin containing the active principle in an organic solvent, such as acetone, and subsequently add the acetone solution to the aqueous soap solution. This procedure is objectionable in that it does not produce a good dispersion but rather results in a mixture in which much of the solid material is undispersed. The instability of such a dispersion is aggravated by the use of hard water which tends to precipitate more of the soap and in any case the container in which the dispersion is prepared will generally be found to be coated with solid material, especially if the dispersion is not used promptly. Obviously, this results in a loss of a relatively expensive insecticidal composition and gives a spray which is non-uniform. Finally, if the spray is not applied immediately, the dispersion will settle almost completely and it cannot be taken up again conveniently in the field.

I have now found that insecticides of the rotenone and pyrethrum type, including the resin extracts which are commonly employed in the art (as, for example, the acetone extract of pyrethrum flowers or the acetone extract of derris root, cube root or other well known rotenone containing herbs), may be dispersed or dissolved readily, conveniently and effectively to form stable, aqueous solutions or dispersions that may, if desired, be made substantially more concentrated than those now commonly employed and which have been found to be more effective due to the additive insecticidal effect of the dispersing agent itself.

The dispersing agents which I have found to be effective for the purpose of my invention are the neutral salts, preferably the alkali or alkaline earth salts such as the sodium salt of sulphonated aromatic compounds which are soluble in acetone or alcohol. The preferred materials within this class are the alkylated or aralkylated salts of sulphonated phenols. Representative phenols include ortho phenyl phenol, para phenyl phenol, mixtures of ortho and para phenyl phenol, ortho benzyl phenol, para benzyl phenol, mixtures of ortho and para benzyl phenol, as well as the more common aromatic alcohols, or, as they are more commonly termed, phenols.

For the purpose of determining the suitability of the dispersing agent I ascertain whether it is soluble in acetone or ordinary ethyl alcohol. The most admirably suited dispersing agents which I have found are also soluble in such common non-aqueous organic solvents as xylene, chlorbenzene, orthodichlorbenzene, eutectic mixtures of ortho and para dichlorbenzenes, etc. This peculiar behavior of organic salts, such as the sodium salts of sulphonated alkylated phenols, has, so far as I know, not been observed heretofore, and has been found convenient in determining whether the dispersing agent can be used effectively in accordance with the principles of my invention. I am aware that many dispersing or wetting agents have been described in recent years, but all wetting agents cannot be used. For example, the common wetting agents consisting of salts of sulphonated aliphatic alcohols, such as lauryl alcohols and which have found wide use in the arts as wetting agents, are not suitable and do not respond to the test set forth above, to wit: solubility in acetone.

An example of one method of preparing a suitable dispersing agent is set forth hereinafter, it being understood that this is merely exemplary of how the dispersing agent can be prepared and forms no part of the present invention.

*Example I.*—907 grams of a mixture of substantially 85% of ortho hydroxy diphenyl and 15% of para hydroxy diphenyl and 800 grams of normal butyl alcohol (the quantities of the hydroxy diphenyl and butyl alcohol employed above are in the ratio of substantially one molecular proportion of hydroxy diphenyl to a slight excess over two molecular proportions of butyl alcohol), were placed in a suitable reactor equipped with a reflux condenser and heated at refluxing temperature for substantially two hours. The reaction product so obtained was then allowed to cool to substantially 75° C., after which 4000 grams of 93% sulphuric acid were added slowly thereto at a temperature of substantially 75° C. to 85° C. After the addition of the sulphuric acid was completed, the resulting product was heated for a period of substantially 4 hours at a temperature of substantially 80° C. to 85° C. The product thus obtained was in the form of two layers, the upper layer of which was drawn off and diluted with water to a volume having a total weight of substantially 6000 grams. The charge was then heated to 90° C. to 95° C. and treated with sufficient freshly slaked lime to convert the free sulphuric acid present to calcium sulphate and to convert the sulphuric acid derivative of the reaction product of normal butyl alcohol and hydroxy substituted diphenyl to the calcium salt thereof. After filtering off the calcium sulphate formed by the liming treatment described, sufficient sodium carbonate, preferably as a concentrated solution thereof, was added to the filtrate to convert the calcium salt of the above described reaction product to the corresponding sodium salt. The calcium carbonate thereby precipitated was filtered off and the filtrate comprising an aqueous solution of one of the preferred materials, which may be called the sodium salt of the sulfonated normal butylated ortho-para hydroxy diphenyl, may, if desirable, be employed as a wetting, penetrating or cleansing agent according to the present invention, or if preferred the aqueous solution thereof may be partially concentrated or completely dried and employed in the form of a solid. Furthermore, other soluble salts than the sodium salt, for example, the potassium salt, may be prepared and employed in the process according to the present invention. Again, the free sulphuric acid derivative described above has been neutralized direct with aqueous sodium hydroxide solution, thus simplifying the more complicated lime and soda ash method.

The aqueous solution may be evaporated to dryness whereby a solid which is hygroscopic results and which may be redissolved in water, acetone and the like. Alternatively, the aqueous solution may be dehydrated by mixing with benzene, toluene, chlorbenzene, xylene, dichlorbenzene, orthodichlorbenzene, and removing the water by distillation as an azeotropic mixture. After all the water has been removed there results a true solution of the sulphonic acid salt in the non-aqueous organic solvent.

Other examples of the preferred class of dispersing agents, the use of which is contemplated by the present invention, are the soluble salts, as for example the sodium salt of the sulphuric acid derivatives of the following reaction products: reaction products of normal butyl alcohol and a mixture of substantially 95% ortho hydroxy diphenyl and substantially 5% para hydroxy diphenyl; reaction products of iso propyl alcohol and a mixture of substantially 95% ortho hydroxy diphenyl and substantially 5% para hydroxy diphenyl; reaction products of normal butyl alcohol and para hydroxy diphenyl; reaction products of normal butyl alcohol and ortho hydroxy diphenyl; reaction products of iso butyl alcohol and a mixture of substantially 95% ortho hydroxy diphenyl and substantially 5% para hydroxy diphenyl; reaction products of normal amyl alcohol and a mixture of substantially 95% ortho hydroxy diphenyl and substantially 5% para hydroxy diphenyl; reaction products of cyclohexanol and a mixture of substantially 95% ortho hydroxy diphenyl and substantially 5% para hydroxy diphenyl; reaction products of octyl alcohol and a mixture of substantially 85% ortho hydroxy diphenyl and substantially 15% para hydroxy diphenyl; reaction products of alpha di-naphthol and beta di-naphthol with normal butyl alcohol, iso propyl alcohol, iso butyl alcohol, normal amyl alcohol, iso amyl alcohol, cyclohexanol, octyl alcohol, cetyl alcohol, and benzyl alcohol, respectively, or mixtures of two or more; reaction products of alpha naphthyl phenol and beta naphthyl phenol with normal butyl alcohol, iso butyl alcohol, normal propyl alcohol, iso propyl alcohol, normal amyl alcohol, iso amyl alcohol, cyclohexanol, octyl alcohol, cetyl alcohol and benzyl alcohol, respectively.

The corresponding benzyl phenol products may be made in an analogous manner.

It is to be understood that I make no claim here to the dispersing or wetting agents themselves but, on the contrary, my invention contemplates the combination of an acetone soluble salt, the preparation of which has been described hereinabove, and an insecticidal material of the pyrethrum or rotenone class. One product sold on the market under the name "Aresco" will be found particularly well suited for use in practicing my invention.

The mode of practicing my invention may be varied and adapted to the specific use for the insecticide. Thus, for example, the pyrethrum or rotenone extract may be dissolved in acetone and mixed with an aqueous solution of the dispersing agent. Alternatively, one may dissolve the dispersing agent in acetone and mix the resulting acetone solution with an acetone solution of the pyrethrum or rotenone extract. Alternatively, the dried dispersing agent may be macerated with the resin containing the active insecticide principle. Other methods of practicing the invention will occur to those skilled in the art, having been advised of representative procedures described herein.

The following specific examples will illustrate the applications of my invention: A wetting agent, such, for example, as is described in Example I and which has been dried by any suitable method, is dissolved in acetone in which there has previously been dissolved an equal part by weight of derris or cube resin or a lesser proportion of rotenone. When acetone is used as the solvent the quantity of solids dissolved may equal 60% by weight of the acetone, but in the case of ethyl alcohol the lesser solubility of derris or cube resin or rotenone does not permit so large a quantity to be used. In either case one obtains a solution which dissolves readily in water and produces a dispersion of the resin in a particle size well suited for use in insecticide sprays. Among the advantages of such a preparation over present day practice may be mentioned the fact that the mixture may be added directly to water in the spray tank without any preliminary operations such as are necessary when acetone alone is used. In the latter case it is necessary to add the acetone solution to a solution of soap, tannic acid, blood albumen or the like which must be used in substantial quantities in order to afford sufficient peptizing action for spray purposes. Moreover, by practicing my invention it becomes possible to use a far greater concentration of derris, cube and the like in the acetone since my dispersing agent will insure its proper dispersion when it is added to water in the spray tank. Since my dispersing agent is an effective wetting agent it lowers the surface tension of the water, even when present in very small concentrations, and thereby insures proper wetting of the insect and of the plant being sprayed. The dispersing agent not only affords a good concentrated dispersion which has excellent wetting properties, but the materials themselves have been found to have marked toxicity. To illustrate, the product made according to Example I has been found to produce a 90% kill when applied in a dilution in water of one part in 200 on chrysanthemum aphids.

A suitable powder or paste which is readily dispersed or dissolved in water may be produced by mixing three parts by weight of the dispersing agent with one part by weight of derris or rotenone resin. Sufficient acetone is added to produce a uniform paste. The resulting mixture is evaporated to dryness, preferably on a water bath and at reduced pressures, whereby a dried product is obtained which may be ground to a powder that disperses readily and permanently in water, producing a dispersion of extremely fine state of subdivision.

The amount of the dispersing agent employed depends to a large extent upon the conditions of use and the specific dispersing agent employed. In general, a ratio greater than one part of the dispersing agent to one part of the derris or pyrethrum resin is preferred. Even though this ratio gives actual dispersion, the particles are sufficiently large to settle in time from the water. For most purposes a ratio of one part of the resin to three parts of the dispersing agent will be found satisfactory. When the ratio is as high as 1:8 the particles of derris are small enough to remain in suspension indefinitely and exhibit Brownian movement under the microscope.

An excellent pyrethrum spray may be obtained by dissolving two pounds of my dispersing agent, such for example as is described in Example I, in a gallon of acetone containing the extracted resin of twenty pounds of pyrethrum flowers. The solution may be evaporated until a thick liquid or thin paste results. This liquid or paste will be found to be soluble in water, giving a practically permanent dispersion of the pyrethrum.

One of the serious disadvantages of insecticides of the pyrethrum and rotenone class arises from the tendency of the active principals to decompose under the influence of light. Thus, for example, these materials, when sprayed and exposed to light, are effective for only a few hours and at the most for only a day or two after they have been sprayed on foliage. It is undoubtedly true that the active principal is protected in the root or flower from which it is extracted by the presence of naturally occurring preservatives. Heretofore, it has been shown that a synthetic dust such, for example, as may be obtained by treating an inert carrier, such as clay, talc and the like, with an extract of pyrethrum is less effective and more susceptible to deterioration than the mascerated or pulverized plant containing the active principle. I have found, however, that if more than 1% and preferably 5% of lampblack is added to such a dust, the resulting product is at least as stable as the plant from which the extract is obtained. This enables one to produce an artificial or synthetic dust of any desired concentration which will withstand oxidative or other deteriorative influences, and which has many advanages over the pulverized plant dust, including uniformity, compactness and greater density. If desired, one may incorporate my dispersing agents described hereinabove, as it has been found that they not only impart an additive toxic value due to their inherent contact-poison properties and possibly also stomach poison properties, as well as the fact that the dispersing materials themselves appear to have definite preservative value as evidenced by the results obtained, which are described more fully hereinafter. Artificial dusts containing pyrethrum or rotenone may be made in the same manner.

In the course of my investigation of the deteriorative influence on pyrethrum and rotenone type insecticides and my search for means or reagents for overcoming this manifestation, I have found that the addition of certain materials used in the rubber industry to overcome oxidative influences and known in the industry as antioxidants are effective in overcoming the deteriorative influence of light on pyrethrum and rotenone. Certain of these antioxidants are exceptionally effective, notably those of the aromatic amine type such as phenyl beta naphthyl amine, phenyl alpha naphthyl amine, and the homologues thereof, well known to those skilled in the art for their antioxidant function in rubber. To illustrate the value of these materials, test samples of pyrethrum powder, such as is commonly employed in dusting flowers, one of which contained no preservatives, the other of which contained the equivalent of 5% phenyl beta naphthyl amine, were exposed to indirect light for 28 days adjacent a hot radiator. At the end of this period the material was tested by introducing the same into a jar containing eight roaches. The following results are typical of those obtained with the phenolic amine preservative reagent:

| Time | Pyrethrum alone | Pyrethrum+5% phenyl beta naphthyl amine |
| --- | --- | --- |
| 10 minutes | All O. K. | 3 helpless. |
| 15 minutes | 1 helpless | 4 helpless. |
| 20 minutes | 2 helpless | All helpless. |
| 60 minutes | 3 helpless | All dead. |

The efficacy of these preservative reagents alone, as well as in combination with lampblack and my dispersing agents, is illustrated by the following tests in which rotenone is the active principal. Strips of cheesecloth approximately 3" wide and 18" long, which have been extracted with acetone and dried, are caused to absorb 5 cc. acetone containing 40 mg. of derris resin and various preservatives. A blank run for comparative purposes contained no preservatives. The test strips were carefully dried and suspended in a frame similar to a curtain stretcher which was then given full exposure for 28 days adjacent a plate glass window offering a southern exposure. The frames were turned each day. At the end of the exposure period each of the cloths was extracted with acetone and the acetone concentrated to 10 cc. This solution was then diluted to 150 cc. with water. The resulting aqueous solution was sprayed on snapdragons which were infested with Myzus persica aphids. A second test on a portion of the solution, which was diluted with an equal volume of water, was made at the same time. In the first instance the solution contained derris resin in a concentration of one to four thousand whereas the diluted solution contained derris resin in a concentration of one to eight thousand. In a number of the tests the water consisted of an aqueous solution containing one part of my dispersing agent, referred to herein as Aresco, in 800 parts of water. The following table of results illustrates the advantages to be gained by practicing my invention:

| | Derris resin concentration | Additional reagents, if any | Aphids sprayed | Mortality |
|---|---|---|---|---|
| | | | | Percent |
| A | 1-4000 | | 2322 | 66.1 |
| A-1 | 1-8000 | | 1522 | 61.4 |
| B | 1-4000 | 40 mg. Aresco | 1385 | 88.3 |
| B-1 | 1-8000 | ....do | 1282 | 86.7 |
| C | 1-4000 | 40 mg. phenyl beta naphthyl amino | 3096 | 88.9 |
| C-1 | 1-8000 | ....do | 1418 | 81.2 |
| D | 1-4000 | 40 mg. phenyl beta naphthyl amino and 40 mg. lampblack | 1255 | 94.7 |
| D-1 | 1-8000 | ....do | 1457 | 89.4 |
| E-1 | 1-4000 | 250 mg. oleic acid | 617 | 66.7 |
| E-2 | 1-4000 | 250 mg. oleic acid and 40 mg. lampblack | 693 | 82.6 |
| E-3 | 1-8000 | ....do | 1067 | 70.4 |
| F-1 | 1-4000 | 40 mg. fresh derris dissolved in 10 cc. acetone | 1853 | 95.5 |
| F-2 | 1-8000 | ....do | 1583 | 91.0 |
| F-3 | | Acetone 1-16, Aresco 1-800 | 962 | 39.4 |

From the foregoing table it will be evident that the Aresco has a distinct insecticidal value even when used in very dilute solutions. It will also be observed that the Aresco has a preservative effect on the active principal and may be employed advantageously with the phenolic amine preservatives. Finally, it will be observed that the addition of lampblack has a favorable effect in combination with the preservatives.

Another set of tests are set forth hereinafter which illustrate the improved results obtainable when pyrethrum powder is exposed to direct sunlight for 28 days:

The blank run contained no preservative. Test A contained pyrethrum powder, 5% phenyl beta naphthyl amine, 5% lampblack, all of which were wetted with acetone before the test. Test B differed from test A in that it contained in addition to the lampblack and phenolic amine, 2% of stearic acid. Test C contained 5% lampblack but was not wetted with acetone. Test D was similar to test C but was wetted with acetone. The blank run containing no lampblack and no other reagents had no insecticidal value at the end of the 28 days of exposure.

A. 5 roaches tested:

| 8 min. | 1 helpless |
| 12 min. | 2 helpless |
| 24 min. | 3 helpless |
| 36 min. | 4 helpless |
| 4 hours | All helpless |
| 15 hours | All helpless |

B. 5 roaches tested:

| 8 min. | 2 helpless |
| 12 min. | 3 helpless |
| 18 min. | 4 helpless |
| 36 min. | All helpless |
| 4 hours | 4 helpless—1 recovered. |
| 15 hours | All dead |

C. 5 roaches tested:

| 18 min. | 1 helpless |
| 4 hours | 1 helpless |
| 15 hours | 1 dead—4 O. K. |

D. 5 roaches tested:

| 12 min. | 1 helpless |
| 24 min. | 2 helpless |
| 36 min. | 4 helpless |
| 4 hours | 4 helpless |
| 15 hours | 1 O. K.—4 dead. |

I have also made the surprising observation that the dispersing agents may be used in relatively dilute aqueous solution as a substitute for nicotine as an insecticide. For this purpose my dispersing agents are particularly suited since they not only have a toxic value comparable with nicotine but, being a dispersing agent and wetting agent, it may be readily applied. In general, I prefer to employ the alkylated aromatic sulphonic acid salts for this purpose. Although the alkylated phenolic sulphonic acid salts do have a substantial toxic effect, the non-phenolic type shows a decided superiority. For example, the butylated sodium sulphonate of diphenyl shows a toxic value which is almost as great as nicotine sulphate. It is to be understood that I make no claim here to the use of nicotine dispersing agents to be utilized in connection with nicotine sulphate, but I do claim the use of the dispersing agents described herein under conditions such that but for the presence of my dispersing agent the insecticide would be void of toxic value for all practical purposes.

Although the foregoing invention has been described in detail as applied to rotenone and pyrethrum insecticides, including the resinous extracts containing the respective active principles, it is to be understood that the invention may be applied to other organic insecticides. It is likewise to be understood that while I have described specifically the use of Aresco and have set forth in detail a method of preparing representative dispersing agents contemplated by the present invention, namely, the butylated sulphonic acid salts of phenyl phenol, benzyl phenol and the like, other methods of preparing these compositions may be employed. In lieu of phenyl phenol, benzyl phenol and the like one may employ the simple phenols such as phenol, naphthol, cresol etc. along with the higher alcohols than butyl alcohol. The alkylation may be effected not only by means of an alcohol but also by means of the chloride or an olefine as is well understood by those skilled in the art. Although the alkylated phenolic sulphonic acid salts are preferred, particularly when an acetone extract is to be employed in conjunction therewith, and have been found to have a wider field of applicability and are therefore preferred to the non-phenolic type, for certain purposes, such, for example, as where the material is to be used as a spray in lieu of nicotine sulphate, I prefer the non-phenolic type dispersing agent disclosed herein. For this purpose one may employ not only the sodium salt but also the salts of other metals such as potassium, calcium, barium or other metals whose toxic value is well recognized. It is surprising that even the sodium salt of these alkylated sulphonic acids are almost as toxic to common insects as nicotine sulphate.

Obviously, one may vary the properties of the dispersing agent as well as the amount of the insecticide, if any is to be employed in conjunction therewith, to meet specific requirements. Other ingredients may be added and modifying agents may be employed in preparing the spray as is practiced and well understood by those skilled in this art.

In the claims the expression "organic insecticide" is used to define the present day insecticides, whether in pure form or as a resinous extract containing the active principle, all of which are essentially insoluble in water and which, therefore, must be used in conjunction with dispersing agents. The most common examples of insecticides of this type include rotenone, pyrethrum, derris resin, cube resin, et al.

What I claim is:

1. A dry insecticidal composition which is readily dispersible in water to form a stable dispersion, comprising an organic insecticide of the rotenone and pyrethrum class and a water soluble salt of a hydroxy substituted aromatic sulphonic acid which is soluble in acetone, said product being produced by dissolving a mixture of the insecticide and dispersing agent in acetone and evaporating said solution to dryness.

2. A stable, liquid insecticidal composition which is readily dispersed in water, comprising an organic solvent that is miscible with water and an organic insecticide, the active constituent of which is one of the following: pyrethrum and rotenone, and an acetone or ethyl alcohol soluble salt of a phenolic sulphonic acid containing a substituent selected from alkyl and aralkyl radicals which is dissolved in a single liquid organic solvent that is miscible with water.

3. The method of producing a substantially dry, stable insecticidal composition, the active principle of which is an organic compound of the rotenone and pyrethrum class, said composition being readily dispersible in water, that comprises forming a solution of the insecticide in an organic solvent, and a salt of a hydroxy substituted aromatic sulfonic acid which is soluble in said acetone or ethyl alcohol, and subsequently evaporating the solvent.

4. An insecticide as defined in claim 5 and further characterized in that it contains finely divided carbon.

5. An insecticidal composition comprising an organic insecticide selected from the group consisting in pyrethrum and rotenone, a single organic solvent for said insecticide, and an acetone or ethyl alcohol soluble salt of an alkylated and sulphonated phenolic compound, which is dissolved in said organic solvent.

6. An insecticidal composition comprising an organic insecticide selected from the group consisting in pyrethrum and rotenone, a single organic solvent for said insecticide, and an acetone or ethyl alcohol soluble salt of an alkylated and sulphonated phenol which is dissolved in said organic solvent.

7. An insecticidal composition comprising an organic insecticide selected from the group consisting in pyrethrum and rotenone, a single organic solvent for said insecticide, and an acetone or ethyl alcohol soluble salt of an alkylated and sulphonated phenyl phenol, which is dissolved in said organic solvent.

8. A dry insecticidal composition which is readily dispersible in water to form a stable dispersion, comprising an organic insecticide selected from the group consisting in pyrethrum and rotenone and a water soluble salt of an alkylated and sulphonated phenol, said product being produced by dissolving a mixture of the insecticide and dispersing agent in acetone and evaporating said solution to dryness.

9. An insecticidal composition which is readily dispersible in water, comprising a mixture of an organic insecticide of the rotenone and pyrethrum class and a phenolic sodium sulphonate containing alkyl or aralkyl substituents, said mixture being dissolved in a solvent selected from a class consisting in aliphatic ketones and aliphatic alcohols.

10. A process of dispersing an organic insecticide of the pyrethrum and rotenone class which comprises admixing said insecticide with a water soluble salt of a phenolic sulphonate containing a substituent selected from a class consisting in alkyl and aralkyl radicals, adding an organic solvent thereto selected from the lower aliphatic ketones and aliphatic alcohols and dispersing in water.

11. A process of dispersing an organic insecticide of the pyrethrum and rotenone class which comprises admixing said insecticide with a water soluble salt of a phenolic sulphonate containing one or more substituents selected from a group consisting of alkyl and aralkyl groups, adding an organic solvent thereto selected from the group consisting in lower aliphatic ketones and aliphatic alcohols, evaporating the resulting product to dryness and dispersing in water.

12. An insecticide as defined in claim 5 and further characterized in that it contains an antioxidant of the naphthyl amine class.

13. An insecticide as defined in claim 5 and further characterized in that it contains an antioxidant of the naphthyl amine class and finely divided elemental carbon.

14. An insecticide comprising derris dust admixed with an alkali metal salt of an alkylated phenolic sulfonate.

15. An insecticide comprising derris dust admixed with an alkali metal salt of an alkylated phenyl phenol sulfonate.

16. An insecticide comprising derris dust admixed with the sodium salt of butylated phenyl phenol sulfonate.

GEORGE L. HOCKENYOS.